UNITED STATES PATENT OFFICE.

HEZEKIAH BAILEY AND WILLIAM HENDERSON BAILEY, OF ST. THOMAS, ONTARIO, CANADA.

GRAINING COMPOUND.

SPECIFICATION forming part of Letters Patent No. 307,617, dated November 4, 1884.

Application filed April 3, 1884. (No specimens.)

*To all whom it may concern:*

Be it known that we, HEZEKIAH BAILEY and WILLIAM HENDERSON BAILEY, both of St. Thomas, in the Province of Ontario and Dominion of Canada, have invented a new and Improved Compound for Graining Wood, Plaster, and other Surfaces, of which the following is a full, clear, and exact description.

The object of our invention is to provide a new and improved compound to be used in graining wood, rough plaster, hard finish, and other substances.

The compound consists of the following ingredients, in the following proportions: cider-vinegar, one pint; saltpeter, two ounces; two fresh eggs; color, suitable quantity. The eggs are well beaten, then mixed with the cider, and then the saltpeter is added, and all is well mixed and shaken. The color can be mixed with the above ingredients, or a sponge is dipped in the compound, and then in the desired powdered color—such as burnt umber, raw sienna, Venetian red, or mixture of the same or other colors, according to effect and imitation to be produced.

By the use of our improved compound any wood of an inferior quality can be made to resemble the most costly wood. The compound can be applied very easily and differs materially from other graining compounds, as it adheres firmly to the wood. It makes a smooth, glossy surface, fills the pores of the wood, and does not injure the wood or paint on which it is applied. On any light-colored wood—such as pine—a perfect imitation of oak, ash, walnut, maple, mahogany, rosewood, or cherry can be produced without first requiring an application of paint on the wood, as the compound fills the pores and renders the surface adapted to receive a coat of varnish.

The compound can be applied on rough plaster or hard-finish walls without first requiring the plaster to be painted. The plaster can be grained to resemble any kind of wood.

The compound fills the pores of the plaster, so that varnish can be applied to the plaster.

The compound does not dry while being worked, so that the grainer has ample time to produce his designs; but as soon as the graining is completed, and the compound is not disturbed after it has been applied, it dries very rapidly.

The compound can be applied by means of a sponge or brush, and flows easily from the sponge or brush. It can be worked by means of coarse or fine combs, the fingers, rags, &c., in the same manner that paint is worked in graining.

Having thus described our invention, what we claim as new, and desire to secure by Letters Patent, is—

The herein-described graining compound, consisting of a mixture of apple-cider, eggs, saltpeter, and color, about in the proportions and in the manner described.

HEZEKIAH BAILEY.
WILLIAM HENDERSON BAILEY.

Witnesses:
E. M. GARWOOD,
E. HORTON.